(12) United States Patent
Padget

(10) Patent No.: US 10,654,188 B2
(45) Date of Patent: May 19, 2020

(54) GUIDE FOOT FOR AN OSCILLATING CUTTING TOOL

(71) Applicants:Robert Bosch Tool Corporation, Broadview, IL (US); Robert Bosch GmbH, Stuttgart (DE)

(72) Inventor: Bradley Padget, Huntley, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 566 days.

(21) Appl. No.: 14/982,319

(22) Filed: Dec. 29, 2015

(65) Prior Publication Data

US 2016/0185006 A1 Jun. 30, 2016

Related U.S. Application Data

(60) Provisional application No. 62/098,392, filed on Dec. 31, 2014.

(51) Int. Cl.
*B27B 19/00* (2006.01)
*B23D 59/00* (2006.01)

(52) U.S. Cl.
CPC .......... *B27B 19/006* (2013.01); *B23D 59/002* (2013.01)

(58) Field of Classification Search
CPC .... B27B 9/02; B27B 5/38; B27B 9/00; B27B 19/06; B24B 13/046
USPC ........................................... 30/374–377, 286
See application file for complete search history.

(56) References Cited

U.S. PATENT DOCUMENTS

| | | | | |
|---|---|---|---|---|
| 1,830,579 | A * | 11/1931 | Wappat | B23D 59/002 30/391 |
| 2,543,486 | A * | 2/1951 | Briskin | B23D 57/0076 30/376 |
| 2,676,624 | A * | 4/1954 | Gecmen | B23Q 9/0028 144/136.95 |
| 3,146,809 | A * | 9/1964 | Botefuhr | B23D 49/167 30/376 |
| 3,479,922 | A * | 11/1969 | Shuey | B23Q 5/043 409/182 |
| 3,722,496 | A * | 3/1973 | Schuman | B28D 1/183 125/13.01 |
| 4,016,649 | A * | 4/1977 | Kloster | B23Q 9/0028 30/373 |
| 4,349,945 | A * | 9/1982 | Fox | B23Q 37/002 144/1.1 |
| 4,353,165 | A * | 10/1982 | Albery | B23D 59/002 30/376 |
| 4,450,627 | A * | 5/1984 | Morimoto | B23D 59/002 30/391 |
| 4,516,453 | A * | 5/1985 | Parham, Jr. | B23D 59/007 83/471.3 |

(Continued)

*Primary Examiner* — Kenneth E Peterson
(74) *Attorney, Agent, or Firm* — Maginot, Moore & Beck LLP

(57) ABSTRACT

A foot for use in supporting a hand-held oscillating power tool on a workpiece includes a plate defining a recess for supporting the body of the power tool at a desired angle relative to the workpiece. The foot includes a plurality of roller elements mounted to the plate and adapted for rolling engagement with the workpiece as the foot is navigated along the surface of the workpiece while performing a cut. An adjustable support may be provided to adjust the angle of the power tool relative to the workpiece.

4 Claims, 3 Drawing Sheets

(56) References Cited

U.S. PATENT DOCUMENTS

| | | | | |
|---|---|---|---|---|
| 4,589,208 A * | 5/1986 | Iwasaki | B27B 9/02 | 30/376 |
| 4,628,605 A * | 12/1986 | Clowers | B23D 49/165 | 30/393 |
| 4,665,617 A * | 5/1987 | Maier | B23D 49/162 | 30/374 |
| 4,856,394 A * | 8/1989 | Clowers | B23D 59/006 | 30/286 |
| 4,928,662 A * | 5/1990 | Chiuminatta | B24B 19/02 | 125/13.01 |
| 5,080,152 A * | 1/1992 | Collins | B23D 45/021 | 144/136.95 |
| 5,121,545 A * | 6/1992 | Nonaka | B27B 9/02 | 30/375 |
| 5,265,340 A * | 11/1993 | Nitz | B23D 59/006 | 30/166.3 |
| 5,289,861 A * | 3/1994 | Hedrick | B23Q 9/00 | 144/134.1 |
| 5,429,109 A * | 7/1995 | Chiuminatta | B23D 59/001 | 125/13.01 |
| 5,579,754 A * | 12/1996 | Chiuminatta | B24D 5/123 | 125/13.01 |
| 5,647,420 A * | 7/1997 | Michell | B23D 59/007 | 144/253.1 |
| 5,758,425 A * | 6/1998 | Gallagher | B27B 9/02 | 30/376 |
| 5,848,472 A * | 12/1998 | Eto | B27B 9/00 | 30/375 |
| 5,890,521 A * | 4/1999 | Dunn | B24B 27/0076 | 144/1.1 |
| 5,901,450 A * | 5/1999 | James | B23Q 9/0028 | 30/371 |
| 5,964,039 A * | 10/1999 | Mizoguchi | B23D 49/165 | 30/124 |
| 6,055,734 A * | 5/2000 | McCurry | B27B 9/00 | 30/391 |
| 6,161,293 A * | 12/2000 | Watson | B23D 45/16 | 30/377 |
| 6,230,411 B1 * | 5/2001 | Wall | B23D 49/165 | 30/375 |
| 6,269,543 B1 * | 8/2001 | Ohkouchi | B23D 45/16 | 30/390 |
| 6,308,424 B1 * | 10/2001 | Stielper | B23D 59/006 | 30/391 |
| 6,691,418 B1 * | 2/2004 | Lewin | B27B 9/02 | 30/375 |
| 6,886,259 B2 * | 5/2005 | Kani | B27B 9/02 | 30/376 |
| 6,951,057 B2 * | 10/2005 | Yoshida | B27B 9/02 | 30/376 |
| 7,770,574 B1 * | 8/2010 | Ferreira | B27B 9/04 | 125/13.01 |
| 7,958,641 B1 * | 6/2011 | Ende | B27B 9/02 | 30/376 |
| 8,006,777 B2 * | 8/2011 | Meixner | B23D 45/16 | 125/13.01 |
| 8,209,872 B1 * | 7/2012 | Ende | B27B 9/02 | 30/376 |
| 8,230,606 B2 * | 7/2012 | Yoshida | B23D 45/16 | 30/370 |
| 9,016,180 B2 * | 4/2015 | Sheddy | B23D 45/02 | 125/13.03 |
| 9,027,542 B2 * | 5/2015 | Ronzello, Sr. | B28D 7/02 | 125/13.01 |
| 9,248,562 B2 * | 2/2016 | Bernardi | B25F 5/00 | |
| 9,434,015 B2 * | 9/2016 | Moreno | B25F 5/001 | |
| 9,533,430 B1 * | 1/2017 | Kalb | B28D 1/30 | |
| 2003/0051352 A1 * | 3/2003 | Clark, Jr. | B23D 49/11 | 30/392 |
| 2003/0070307 A1 * | 4/2003 | Walker | B23D 51/16 | 30/374 |
| 2003/0183303 A1 * | 10/2003 | Heinlen | B25H 1/10 | 144/285 |
| 2004/0126197 A1 * | 7/2004 | Allemann | B23C 5/10 | 409/182 |
| 2006/0288592 A1 * | 12/2006 | Roberts | B23D 49/167 | 30/392 |
| 2007/0209217 A1 * | 9/2007 | Ritter | B23D 49/11 | 30/392 |
| 2008/0210072 A1 * | 9/2008 | Chang | B23D 45/048 | 83/471.3 |
| 2011/0094113 A1 * | 4/2011 | Delfini | B23D 55/084 | 30/380 |
| 2011/0185582 A1 * | 8/2011 | Koeder | B23D 49/165 | 30/392 |
| 2013/0081841 A1 * | 4/2013 | Moreno | B23D 47/12 | 173/216 |
| 2014/0013917 A1 * | 1/2014 | Meier | B23D 51/025 | 83/829 |
| 2014/0312033 A1 * | 10/2014 | Van Der Linde | B25H 3/006 | 220/4.28 |
| 2015/0246399 A1 * | 9/2015 | Knight | B23D 45/044 | 83/397 |

\* cited by examiner

GUIDE FOOT FOR AN OSCILLATING CUTTING TOOL

PRIORITY CLAIM

This application is a non-provisional filing of and claims priority to U.S. Provisional Application No. 62/098,392, filed on Dec. 31, 2014, the entire disclosure of which is incorporated herein by reference.

BACKGROUND

The disclosure relates to hand-held power tools, and particularly to tools having an oscillating cutting blade.

Hand-held oscillating power tools are very useful for performing cuts and other operations that cannot be achieved with rotary power tools, such as rotary saws. For instance, oscillating tools are very well-suited for making flush cuts, and are useful to perform various sanding and grout removal operations. One known oscillating power tool 10 is shown in FIGS. 1B, 1C performing two types of cuts in a workpiece surface S. Oscillating tools do not include a substantial foot for supporting and guiding the tool as the blade is moved across the work surface. In contrast, circular saws are provided with a substantial foot to support the weight of the tool and to provide a solid plane to counteract cutting forces In order for the teeth of the cutting blade of an oscillating tool to cut through a workpiece, the angle of the tool body and the depth of the blade within the workpiece must coincide in order for the blade to work through the thickness of the workpiece. However, oscillating blades are typically very thin in order to keep the oscillating inertia to a minimum. The thin blades tend to bend and curve when cutting through a workpiece, particularly since the oscillating tool is not provided with a solid support foot. On the other hand, adding a large foot, as found on a circular saw, adds friction that hampers the ability to move the tool along the workpiece surface, and adds inertia that makes the tool unwieldy when trying to compensate for the blade curving.

Oscillating tools are often provided with accessories to add a depth guide or a foot. For instance, accessories 11 shown in FIG. 1A may be provided for attachment to a tool, such as the tool 10. The accessories include a mounting collar 15 that is clamped to a surface of the power tool adjacent the blade drive. The collar includes a fixture 16 for mounting a depth guide 18, shown in use in FIG. 1B, and a foot 19, shown in use in FIG. 1C. The foot 19 includes an adjustable shaft 19a that is engaged in the fixture 16 to provide a variable distance of the foot 19 from the tool 10. Both accessories 18, 19 provide means to control the depth of the cutting blade of the tool into the workpiece surface S. However, neither accessory provides the same level of support and load bearing capability found in the circular saw foot, and neither accessory provides means for supporting the oscillating power tool at an optimum angle relative to the workpiece surface.

SUMMARY

A guide foot is provided for use in supporting an oscillating power tool on a workpiece during the performance of a cut. In one aspect, the foot includes a plate defining a recess for supporting the body of the power tool at an optimum or desired angle relative to the workpiece. The foot also ensures that the cutting blade extends above and below the workpiece when making a straight cut in order to reduce the ill effect of chips impinging on the blade during a cut. In one feature, the foot includes a plurality of roller elements adapted for rolling engagement with the workpiece as the foot is navigated along the surface of the workpiece while performing a cut.

In another aspect, the foot may include an adjustable support to adjust the angle of the power tool relative to the workpiece. In yet another feature, the recess may be provided as a recess insert that is fitted within a corresponding cut-out in the plate. A plurality of recess inserts may be provided that conform to the configuration of different power tool bodies.

DETAILED DESCRIPTION

Figure 1A:
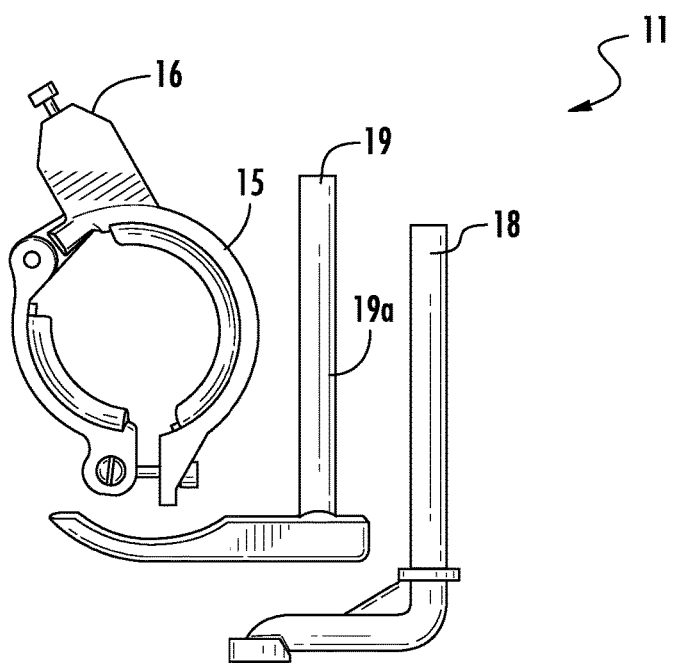
FIG. 1A is a top view of accessories for use with the oscillating power tool shown in FIGS. 1B, 1C.

For the purposes of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles disclosed herein as would normally occur to one skilled in the art to which this disclosure pertains.

Figure 1B:
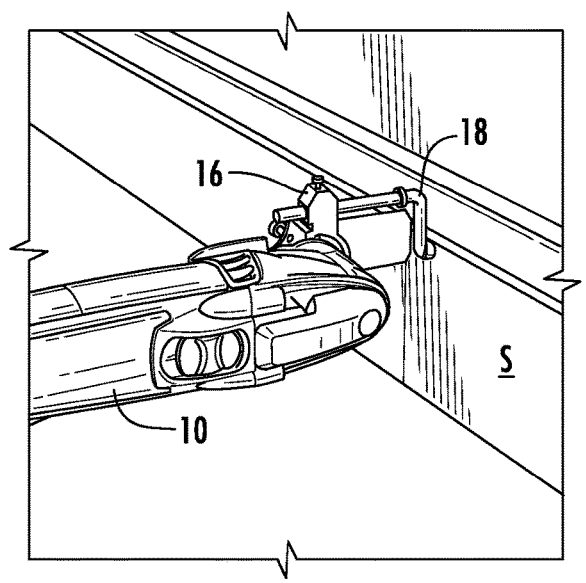
FIG. 1B, 1C are perspective views of a prior art oscillating power tool shown with accessories of FIG. 1A for use in performing two types of cuts.
Figure 1C:
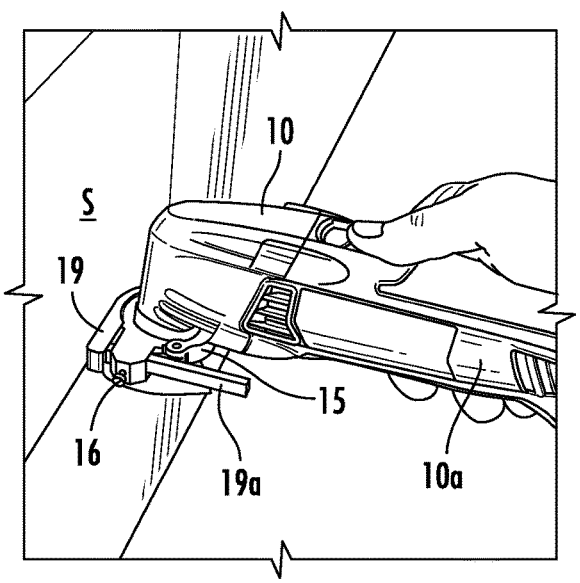
Figure 2:
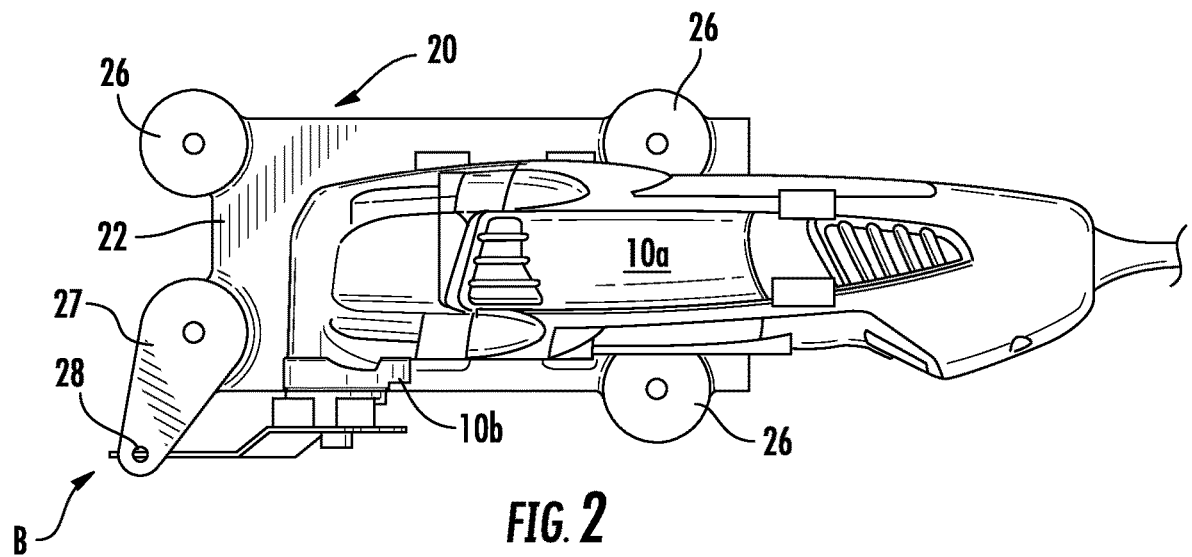
FIG. 2 is a top view of a foot shown in FIG. 4 supporting the oscillating power tool shown in FIGS. 1B, 1C.
Figure 5:
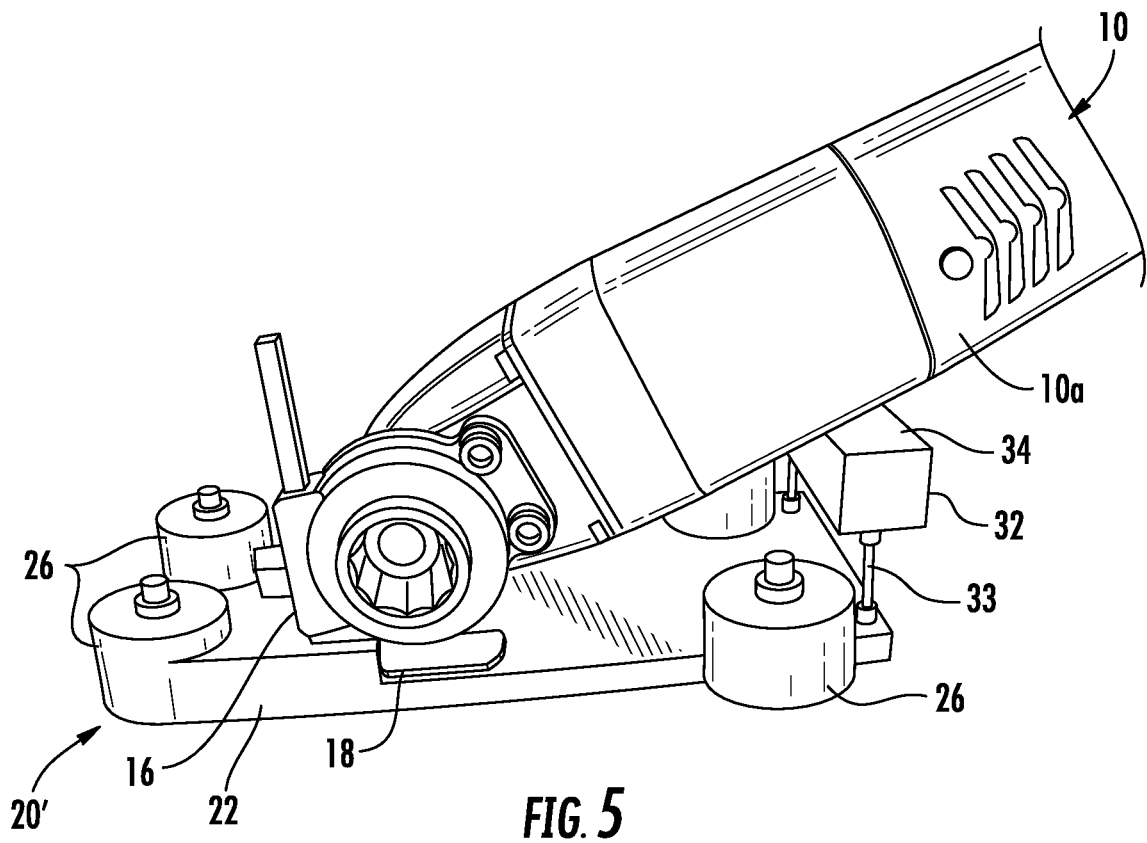
FIG. 5 is a view of a foot incorporating an angle adjustment feature according to one aspect of the disclosure for supporting an oscillating power tool at an angle to the workpiece.

The disclosure contemplates a foot 20 configured to support an oscillating power tool, such as the power tool 10 shown in FIGS. 1B, 1C without the need for the accessories 11. The foot 20 includes a plate 22 that may define a cavity or recess 24 configured to receive a portion of the body 10a of the power tool, as depicted in FIG. 5. The recess 24 may further incorporate a saddle 25 arranged to support the output portion 10b of the oscillating power tool, as illustrated in FIG. 2.

Figure 3:
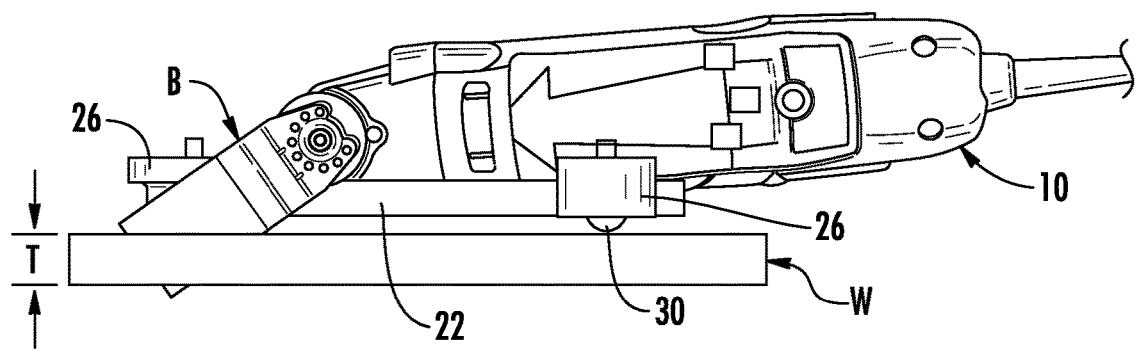
FIG. 3 is a side view of the foot supporting the oscillating power tool on a workpiece shown in FIG. 2.

The plate includes four hubs 26, 27 for supporting a roller element, such as the ball-type roller 30 shown in FIG. 3. The roller 30 is supported for free motion within each hub 26, 27. For instance, the ball-type roller 30 may be supported within the hubs in the manner of a roller ball or track ball in a computer mouse. The roller 30 may be formed of any suitable material capable of generally friction-free rolling within the hubs, such as a smooth plastic or metal. The ball-type roller allows the foot 20 to be moved in any direction on a work surface, which can facilitate aligning the working element or cutting blade of the power tool. Full-directional movement also helps the user steer the power tool to compensate for any curvature that develops in the cutting blade. Alternatively, the roller 30 may be a cylinder roller which inherently limits the movement of the power tool to a linear movement. As a further alternative, the rollers 30 may instead be in the form of a very low-friction surface, such as a highly polished metal dome or a smooth plastic component, provided that the component does not leave marks or blemishes on the surface against which the tool travels. The ball-type roller may be preferable since the roller does not slide on the surface and is therefore less likely to leave a mark.

The hubs 26, 27 and rollers 30 may be preferably situated at the four corners of the plate 22 to enhance the maneuverability of the foot 20 when the power tool is mounted thereon. As depicted in FIG. 3, the hubs and rollers support the tool 10 close to the surface of the workpiece W so that the cutting blade B can pass through the thickness T of the workpiece as desired. The recess 24 and saddle 25 may thus be configured to tilt the power tool 10 slightly, as shown in FIG. 3 to position the blade B as close as possible to the workpiece W. It can also be appreciated that the oscillating blade has a limited range of oscillation, often in the range of one to three degrees (1-3°), so it is important that the blade maintain a proper orientation relative to the workpiece. Other angular orientations of the tool may be accomplished by an adjustable support 32 mounted to the plate 22, as illustrated in FIG. 5. The support may include adjustable support posts 33 mounted to the plate 22 of the modified foot 20'. The posts 33 may be telescoping posts capable of elevating the rear of the power tool through a wide range of angles. The tool may be carried by a support body 34 mounted on the posts 33 and configured to receive the body 10a of the power tool. The body 34 may thus define a recess adapted to receive the body 10a of the tool. It is further contemplated that the adjustable support 32 may incorporate features to temporarily restrain or fasten the tool to the support so that the tool and foot 20' can be easily manipulated as a unit.

Figure 4:
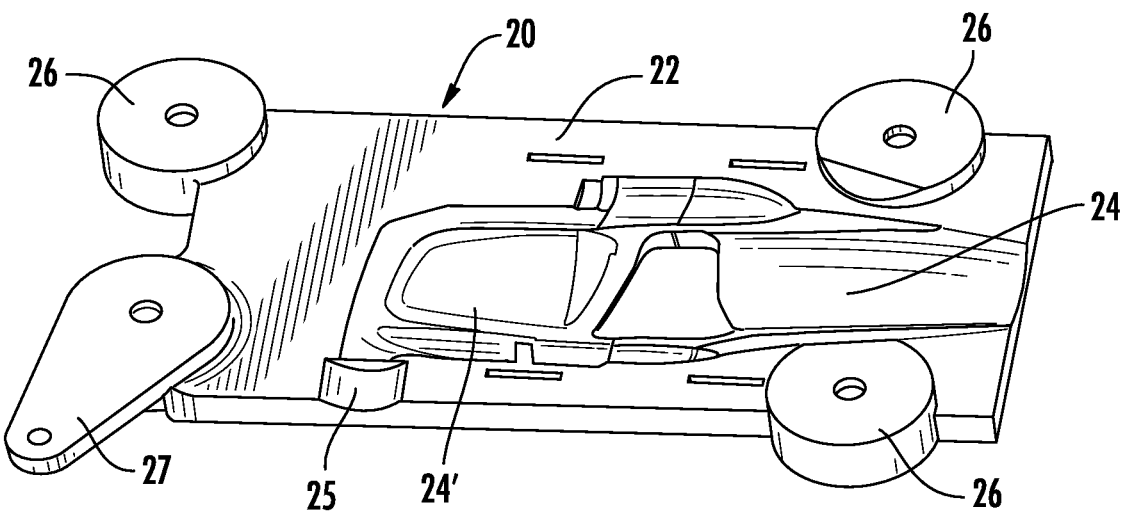
FIG. 4 is a top perspective view of the foot shown in FIGS. 2-3.

Returning to FIGS. 2 and 4, the hub 27 that supports one of the rollers 30 may be modified to include a blade guide feature 28. In one embodiment, the feature 28 may be a roller or similar bearing surface that bears against the working end of the blade B to help prevent the blade form bending during a cut. The blade guide feature may be configured and operate in a manner similar to the blade guide features used in jigsaws to help stiffen the oscillating tool blade. This guide feature 28 can thus help the operator maintain the blade on a straight path when making a long cut. The hub 27 may be adjustably mounted to the plate 22 to move the feature 28 in relation to the particular oscillating cutting tool, as reflected by the arrows associated with hub 27 in FIG. 2, to account for different blade geometries. Alternatively, the blade guide feature 28 may be removable or the hub 27 may be configured like the other hubs 26 without a blade guide feature, as depicted in the embodiment shown in FIG. 5

The foot 20 provides a stable platform for supporting the oscillating power tool 10 akin to the foot provided on circular saws. The user can apply pressure to push the tool body 10a into the recess 24 and saddle 25, with the direction of pressure being in the same direction as needed to guide the tool in performing a cut in a workpiece W. In other words, the recess 24 is configured so that the user can apply a force toward the workpiece with a forward force component in the direction of the desired cut. With this pressure the tool 10 is assured of maintaining a proper angle relative to the workpiece W so that the oscillating blade B engages the workpiece at an optimum angled orientation, as illustrated in FIG. 3. The user can use the same application of force to guide the foot 20 with the roller elements 30 rolling smoothly on the surface of the workpiece. The ball-type roller elements 30 allow the foot to be maneuvered with little additional effort, while at the same time reducing the force required to push the cutting blade through the workpiece. In the embodiment of FIG. 5, the angle of the tool to the workpiece can be optimized for the particular tool and cutting operation by way of the adjustable support 32

The foot may be configured to accommodate a wide range of oscillating tools. In one aspect, the recess 24 may be in the form of a recess insert 24' that is calibrated to a particular tool. The recess insert 24' fits into a standard cut-out (not shown) in the plate 22, while the surface of the recess is shaped according to the tool being used. The foot may thus be provided with several recess inserts 24' for use with several different tools. The foot may also be configured to accommodate accessories associated with a particular tool. For instance, as shown in FIG. 5, the fixture 16 described above in connection with FIG. 1A, may be mounted to the blade support of the tool and a depth guide 18 may be held by the fixture, in the manner shown in FIG. 1B. The foot thus accommodates the tool with the fixture and depth guide already attached.

The foot 20 may be formed from metal or a hard, durable plastic. With the latter material the foot may be integrally cast as one piece, including the cavity and hubs for the roller elements. The hubs may be hollow with a press-fit opening for introducing the ball-type roller elements into the hub. The plate has a thickness that is sufficient to firmly support the power tool without elevating the blade unnecessarily above the workpiece surface. More particular, the plate has a thickness that allows the blade B to pass through the full thickness T of the workpiece, as shown in FIG. 2. In one embodiment, the plate has a thickness of about ¼ inch. The span of the plate is configured to provide a stable base or foot for the power tool as it is drawn over the workpiece while performing a cut. In one specific embodiment, the plate 22 is rectangular with a length of about 5-7 inches in the direction of the power tool and a width of about 3-5 inches.

The disclosure should be considered as illustrative and not restrictive in character. It is understood that only certain embodiments have been presented and that all changes, modifications and further applications that come within the spirit of the disclosure are desired to be protected.

What is claimed is:

1. A foot for supporting a hand-held power tool on a workpiece, the power tool having a blade operably driven at an output portion at a working end of the tool, the foot comprising:
    a plate defining a recess configured to receive and support at least the working end of the power tool with the blade positioned to contact the workpiece;
    a plurality of elements supported by the plate, each of the plurality of elements configured for rolling or sliding contact with the surface of the workpiece for movement of the foot along the surface of the workpiece,
    wherein said recess is configured to retain at least the working end of the power tool within said recess when the foot is moved along the surface of the workpiece with the blade positioned in contact with the workpiece,
    wherein the recess has a first portion configured to receive a portion of a body of the power tool, the first portion intersecting a first edge of the plate,
    wherein the recess further has a second portion extending substantially perpendicular to the first portion, the second portion defining a saddle at a second edge of the plate, the saddle configured to receive the output portion of the power tool to support the tool with the blade adjacent one side of the plate.

2. The foot of claim 1, wherein each of the plurality of elements is a roller ball mounted within a hub supported on the plate for rolling movement within the hub when in contact with the surface of the workpiece.

3. The foot of claim 1, wherein the plate is rectangular with four corners and one of said plurality of elements is positioned at a corresponding one of the four corners.

4. The foot of claim 1, wherein the plate is formed of a plastic.

\* \* \* \* \*